Sept. 8, 1931.  H. STUECKMAN  1,822,828
CUTTING IMPLEMENT
Filed Oct. 2, 1929
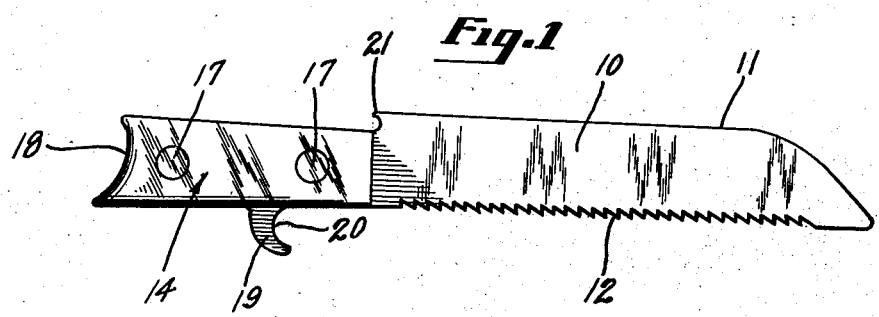
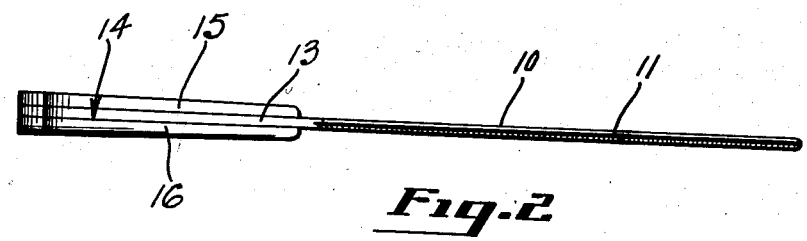
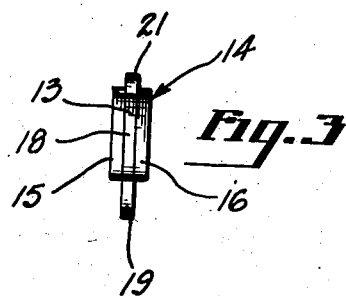
Herman Stueckman INVENTOR
BY Victor J. Evans
HIS ATTORNEY Patented Sept. 8, 1931

1,822,828

UNITED STATES PATENT OFFICE

HERMAN STUECKMAN, OF CHICAGO, ILLINOIS

CUTTING IMPLEMENT

Application filed October 2, 1929. Serial No. 396,783.

This invention relates to certain novel improvements in cutting implements and has for its principal object the provision of an improved construction of this character which will be highly efficient in use and economical in manufacture.

It is among the objects of my invention to provide a cutting implement which will have a handle associated therewith that will permit the device to be very effectively gripped during use thereof.

Another object of the invention is to provide a cutting implement which will embody a serrated edge providing a saw which will also have associated therewith a knife edge.

A further object of the invention is to provide a device of the above described character which will have associated therewith a bottle opening device.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a preferred form of construction for my invention;

Fig. 2 is a plan view of the device as illustrated in Fig. 1; and

Fig. 3 is a view looking in at the left hand end of Fig. 1.

In the accompanying drawings wherein I have illustrated a preferred form of construction for my invention 10 generically indicates the blade portion of my improved cutting implement which has provided along one edge thereof a cutting edge or knife 11 and the opposite edge is serrated as indicated by 12 to provide a saw. The blade 10 includes a portion 13 which has a handle structure generically indicated by 14 associated therewith. The handle structure 14 includes plates 15 and 16 which are secured in side by side relation with the handle portion 13, the securing being brought about by the employment of rivets 17.

The outer end portion of the handle 14 embodies a curved configuration generically indicated by 18. Depending from the portion 13 is a lug 19 which embodies a curved configuration providing a finger rest 20.

In using the serrated edge 12 the device is gripped with the curved configuration 18 rested against the base of the thumb while the index finger is rested in the finger portion 20 and it is, therefore, manifest that the device may be very effectively gripped which will obviously facilitate the using of the serrated edge or saw 12.

The edge of the device embodying the cutting edge 11 is of greater width than the inner end of the handle and the edge thereof extending up from the handle embodies a recess 20 which defines a lug 21. This arrangement provides a bottle opening device as the cap on the bottle may be caught by the lug 21 so as to facilitate removal thereof.

It is manifest from the foregoing description that I have provided an expeditious arrangement for a combined knife and saw. It is also manifest that I have provided a very efficient handle arrangement which will permit very effective gripping of the device and it is manifest that the construction embodies an arrangement which will permit usage thereof as a bottle opening device.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A device of the character stated, comprising a blade having a serrated edge providing a saw, and a handle structure for said blade, said handle structure including spaced apart parallel members, said members having an inwardly extending concave recess formed in the rear ends thereof providing a gripping surface adapted to be disposed between the base of the thumb and the index finger in the use of said device, said blade including a portion extending between said members, said blade portion having a portion depending therefrom defining a lug providing a finger gripping surface, and means for securing said blade portion to said handle members.

2. The combination with a saw blade including a handle receiving portion provided with a depending lug defining a finger gripping surface, of a handle structure comprising spaced apart parallel members adapted to have said handle receiving portion extended therebetween, said members having an inwardly extending concave recess formed in the rear ends thereof defining a gripping surface adapted to be disposed between the base of the thumb and the index finger in the use of said saw blade, and means for securing said handle members to the handle receiving portion of said blade.

3. The combination with a cutting implement including a blade provided with a handle receiving portion, said handle receiving portion including a depending lug providing a finger gripping member, of a handle structure comprising spaced apart parallel members adapted to have said handle receiving portion extended therebetween, said members having an inwardly extending concave recess formed in the rear ends thereof defining a gripping surface adapted to be disposed between the base of the thumb and the index finger in the use of said implement, and means for securing said handle members to the handle receiving portion of said implement.

4. A handle structure for a cutting implement comprising spaced apart parallel members adapted to receive a portion of a cutting implement therebetween, said members having an inwardly extending concave recess in the rear ends thereof providing a gripping surface, a lug depending from the portion of said implement receivable between said members, said lug providing a finger gripping member, and means for interconnecting said members in spaced apart relation.

In testimony whereof I affix my signature.

HERMAN STUECKMAN.